July 13, 1965  M. B. DAGNEAU ETAL  3,194,013
ANTI-CHUNKING
Filed June 6, 1961  2 Sheets-Sheet 1

INVENTORS
MERVYN B. DAGNEAU
ROBERT L. NOLAND
WARREN C. TRAVIS
BY Cushman, Darby & Cushman
ATTORNEYS

INVENTORS
MERVYN B. DAGNEAU
ROBERT L. NOLAND
WARREN C. TRAVIS
BY

ATTORNEYS

United States Patent Office 3,194,013
Patented July 13, 1965

3,194,013
ANTI-CHUNKING
Mervyn B. Dagneau, La Mirada, Robert L. Noland, Santa Fe Springs, and Warren C. Travis, Lakewood, Calif., assignors, by mesne assignments, to Haveg Industries, Inc., a wholly owned subsidiary of Hercules Powder Company, New Castle, Del., a corporation of Delaware
Filed June 6, 1961, Ser. No. 115,186
9 Claims. (Cl. 60—35.6)

This invention relates to materials designed to resist high temperatures and more specifically relates to the problem of chunking which occurs during high temperature and more specifically relates to the problem of chunking which occurs during high temperature operations.

Current trends in the field of rocketry are directed towards use of higher specific impulse propellants in conjunction with lower weight inert components. The higher energy propellants usually are accompanied with higher temperature products of combustion which result in the inert components being heated to higher temperatures during rocket operation. The net result is that the inert components must be given more protection from overheating through the use of appropriately designed heat insulators. This is especially true when it is realized that the highly stressed inert components are less massive and will thus reach higher temperatures when subjected to comparable heat inputs. Accordingly, the heat insulators perform a very important function in the new highly efficient rocket motors now in use as well as those being designed.

The efficiency of the heat insulator is primarily a function of its ability to withstand the highly erosive forces imposed upon it by the hot gases as well as its ability to exhibit heat transmission characteristics that will not allow the stressed inert component to become overheated during operation. Also of importance is the density of the insulator material since the trend is towards the use of low density materials if they could perform satisfactorily. The current insulators consist primarily of a fibrous type material such as glass, asbestos, silica or quartz bonded together by use of either a low or high pressure molding operation. Recently a new fibrous material has been employed, namely, graphite fibers. This fiber when utilized in conjunction with a phenolicformaldehyde resin system has exhibited excellent erosion or ablative resistant characteristics when exposed to the high velocity product of combustion of a rocket motor.

A major problem has been encountered in the use of graphite fibrous material, especially when employed in the nozzle exit cone of extremely highly erosive rocket motors. One such rocket motor is the third stage Minuteman. The difficulty resolves around a tendency for the material to erode unevenly during operation since, if erosion does occur, it is highly desirable that it occur uniformly about its centerline. When compared with the fibrous graphite insulator the other types of insulating materials exhibit more uniform erosion characteristics but still there is room for improvement. The fibrous graphite material tends, in particular, to exhibit a localized type of erosion known as chunking or spauling in which pieces of material varying in size from approximately ½ to 2 inches in diameter and thicknesses from ⅛ to ⅜ inch are broken away from the prime structure.

It is an object of the present invention to eliminate or reduce the problem of chunking which occurs in materials which are subjected to high temperatures.

Another object is to eliminate the chunking which occurs when insulators comprising fibrous graphite are subjected to high temperatures.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

The present invention will be best understood in connection with the accompanying drawings wherein.

Figure 1:
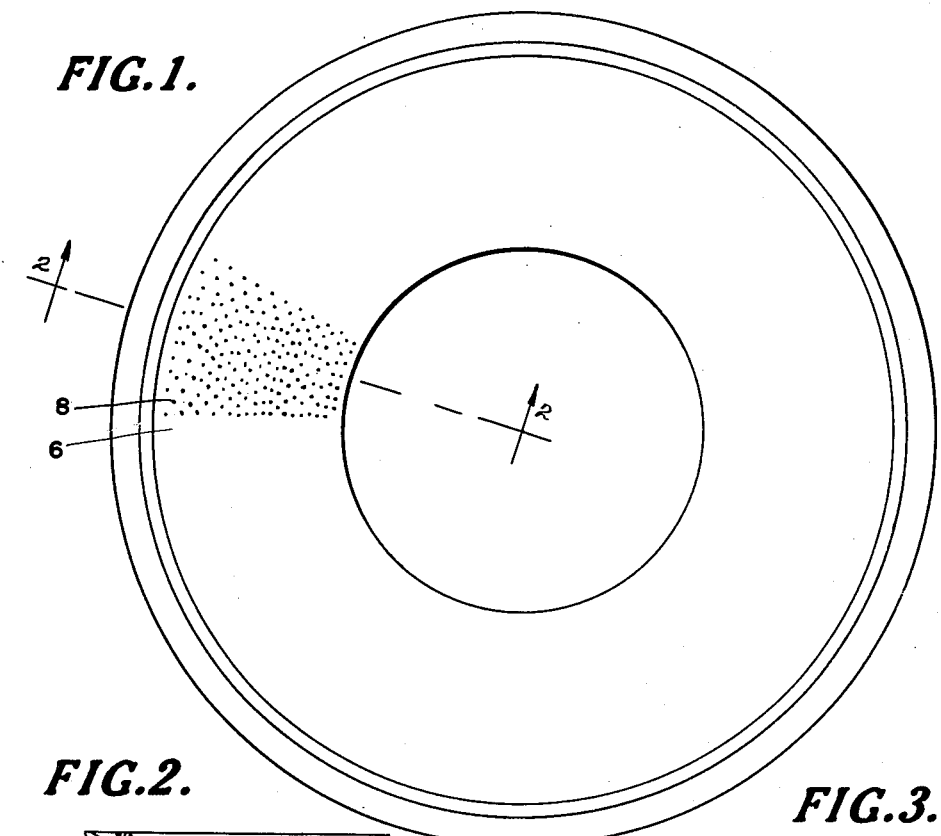
FIGURE 1 is a plan view of one type of rocket insulator.

A series of experiments were conducted to establish the basic parameters that are associated with the phenomenon of chunking. In the experiments a fibrous graphite-phenolic-formaldehyde molding compound (70% graphite—30% resin) was utilized in the fabrication of test samples 2.5 inches in diameter by approximately ¼ inch thick. The fibrous graphite-phenol-formaldehyde compound was fabricated from chopped ½ x ½ inch square of graphite fibrous cloth (National Carbon) impregnated with the phenol-formaldehyde resin (e.g., Monsanto SC 1008 Phenolic Resin). These samples were compression molded at molding pressures varying from 1,000 to 35,000 p.s.i. in order to establish the effect of molding pressure on the chunking characteristics. The samples were given a preliminary evaluation testing by subjecting each to an oxygen-acetylene torch jet blast. These tests indicated that the chunking characteristics could not be closely correlated with molding pressure because each sample, regardless of molding pressure, exhibited a tendency towards this type of failure. The specimens molded at the extremely high pressures, above 20,000 p.s.i., exhibited a more violent expulsion of the chunks from the prime structure.

In some instances the samples did not actually fail by chunking, but when these specimens were sectioned and observed they showed that a crack or internal fissure had formed as a result of being subjected to the jet blast. If the molded structure directly above the formed fissure had exhibited lower structural characteristics, chunking would have occurred. This accounts for the sporadic occurrence of chunking since in the molded parts there is a random distribution of fiber resulting in localized variation in strength characteristics. It is not possible to fabricate a part which has perfect distribution of the fibers which would then result in an essentially uniform distribution of structural characteristics. This was verified by fabricating and testing samples in which a macerate of the graphite fiber-phenol-formaldehyde molding compound was utilized. This resulted in a molded specimen in which none of the fibers exceeded a length of ¹⁄₁₆ inch, whereas in the initial specimen the average fiber length amounted to ½ inch. When these specimens were subjected to the jet blast test, chunking occurred in every instance. This program indicated that the chunking characteristics occurred as the result of the formation of gases within the molded structure. To rectify this it is necessary to provide a means for exhausting the gases from the structure as they form.

It has now been found that the problem of chunking can be solved by drilling holes or otherwise providing a porous or foraminous structure for the insulator.

Samples of fibrous graphite cloth-phenol-formaldehyde of the same type as that used in the experiments just described were modified to the extent that a series of 1/16 inch diameter holes were drilled half-way through the samples. When these samples were subjected to the jet blast test there was no formation of internal fissures, nor did any chunking occur. The drilled holes provided sufficient passage area to adequately exhaust the gases as they were formed.

The present invention is particularly designed for applications were resistance to temperatures of at least 2000° F., and even 4000° F., 6000° F. or higher, e.g., 25,000° F., is required. The resistance should not merely be instantaneous but normally the insulator should protect against the indicated temperatures for many seconds, or even many minutes.

The products of the present invention can be utilized as exit cone insulators, nose cone insulators, nozzle insulators, reentry skin panels, throat piece insulators, booster insulators, bulkhead insulators, rocket combustion chamber insulators and, in general, where a heat insulating or ablative resistant material is required.

As has previously been indicated, the invention is particularly effective with resin or polymer impregnated and molded parts of fibrous graphite. In place of the fibrous graphite, there can be employed other inorganic fibers including silica fibers, alumina fibers and other metal oxide fibers, e.g., zirconia fibers and asbestos fibers of both the chrysotile and amphibole variety, e.g., anthophyllite and amosite. From 5–60% by weight, usually 15–60%, of the total of fibers and resin or polymer is resin and the balance inorganic fibers. At present it is preferred to use about 30% of resin and 70% of fibers.

While the entire insulator can be made of the graphite fiber-resin material, it is also frequently desirable to replace a portion of the graphite fiber-resin, e.g., 50%, by another heat resistant material such as silica fiber-resin or silica fiber-elastomer to form a composite laminate. The silica fibers are preferably acid extracted silica fibers.

The inorganic component, e.g., graphite fibers, silica fibers or the like, is preferably employed in the form of cloth although it can be used as yarn, cordage, or the like. The cloth is preferably chopped into pieces from 1/32 inch to 2 or 3 inches square. However, the cloth can be employed in the form of long rolls.

The porous structure can be obtained in many ways. Thus, holes can be drilled in the molded product before use. Alternatively, the inorganic fibrous material and resin or elastomer can be mixed with a material that can be subsequently removed and this mixture molded. Thus, there can be incorporated in the molding compound potassium chloride or potassium sulfate or other water soluble salt and then the molded product leached with water to obtain a porous structure. Alternatively, a multitude of steel wires can be incorporated in the molding compound and the wires leached out, e.g., by the use of concentrated hydrochloric acid after molding. Additionally, there can be employed aluminum fibers which can be leached out with alkali, e.g., sodium hydroxide, after molding.

When a composite laminate is employed, the holes can be drilled or otherwise formed in the graphite fiber layer only or can be drilled through all layers. To form a composite laminate a chopped cloth of silicate fibers, e.g., glass fibers of 0.09 to 3 microns diameter, for example, impregnated with resin, e.g., 30% of phenol-formaldehyde, is preformed to size. The graphite fiber and resin, e.g., 30% phenol-formaldehyde, is also preformed to size. Then the two preforms are assembled together and heat and pressure applied to form the composite laminate.

As the resin or elastomer there can be employed any of the materials in Ward Patent 2,835,107. Typical examples include thermosetting resins including phenol-formaldehyde resins, phenol-furfural, m-cresol-formaldehyde, xylenol - formaldehyde, resorcinol - formaldehyde, urea-formaldehyde, aminotriazine-aldehyde resins, e.g., melamine-formaldehyde, furfuryl alcohol resins, furfuryl alcohol-furfural, epoxy resins, e.g., those having glycidyl groups in such quantity that the material has a 1,2-epoxy equivalency in the average molecule of greater than one. As examples of epoxy resins there can be used bisphenol-A epichlorhydrin, resorcinol - epichlorhydrin, glycerol-epichlorhydrin, novolak- epichlorhydrin, etc.

Also, there can be used triallyl cyanurate resin, diethylene glycol bis allyl carbonate resins, diallyl phthalate resin and polyester resins, e.g., polyesters made from glycols such as ethylene glycol, diethylene glycol, propylene glycol, dipropylene glycol, butanediol 1,3 and dibasic acids such as maleic acid, fumaric acid, cis-3,6-endomethylene-$\Delta^4$-tetrahydrophthalic acid, hexachloroendomethylene tetrahydrophthalic acid, itaconic acid, citraconic acid, etc. There can be used saturated aliphatic and aromatic acids such as succinic acid, adipic acid, phthalic acid, tetrachlorophthalic acid. Also, there can be employed alcohols such as glycerine, pentaerythritol, trimethylolpropane and trimethylolethane, as well as acids such as citric acid, trimesic acid, hemimellitic acid, etc. In making the polyester resin, vinyl or vinylidene monomers can be incorporated such as styrene, vinyl toluene, e.g., o-vinyl toluene, diallyl phthalate, methyl methacrylate, vinyl acetate, p-chlorostyrene. A typical polyester is a styrene modified propylene glycol phthalic anhydride maleic anhydride condensation product.

Resins which have been cross-linked by chemical means or by irradiation can be employed. Thus, there can be used polyethylene which has been cross-linked by peroxides, e.g., benzoyl peroxide, or by irradiation, e.g., by subjection to 2 to 200 megarep of high energy ionizing radiation as shown in Rainer et al. Patent 2,877,500, butadiene resins, styrene-divinyl benzene copolymer, etc.

As elastomers (or rubbers) there can be used natural rubber, butadiene-styrene copolymers, butadiene-acrylonitrile copolymers, butadiene-vinyl pyridine copolymers, isobutylene-isoprene copolymers, isobutylene-butadiene copolymers (butyl rubber) and other isoolefin copolymers as set forth in Sparks et al. Patent 2,356,128, neoprene, polysulfide rubbers as shown in Patrick Patent 2,195,380 (polyalkylene polysulfides and the like).

The proportions of resin or elastomer to fiber, as previously indicated, can range from 5 to 60% resin or elastomer to the total of resin or elastomer and inorganic fiber.

Figure 2:
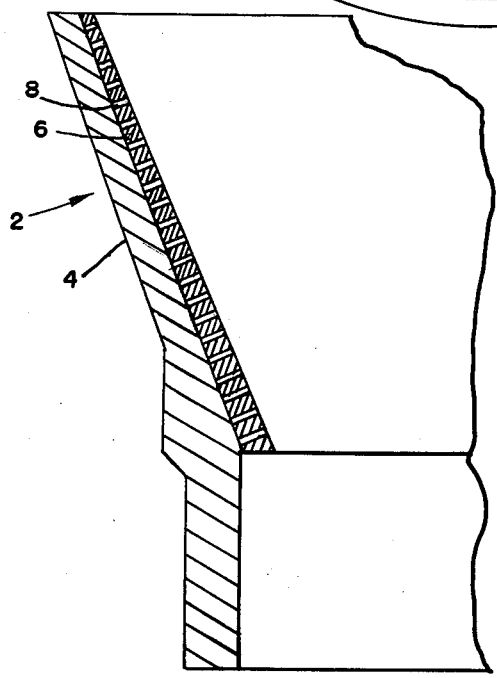
FIGURE 2 is a seconal view on the line 2—2 of FIGURE 1.
Figure 3:
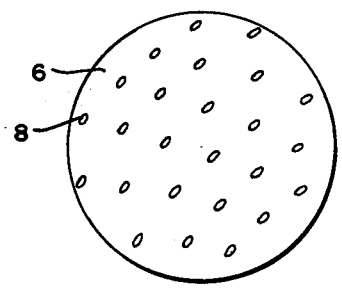
FIGURE 3 is an enlarged view of a portion of the surface of the insulator of FIGURE 1.

Referring to FIGURES 1–3 of the drawings, there is provided an exit cone 2 having an aluminized shell 4 and an insulator 6 made of fibrous graphite cloth (National Carbon) impregnated with 29% by weight of phenol-formaldehyde resin (Monsanto SC 1008) and chopped into ½ inch squares. The impregnated cloth was preformed to size at a temperature below 180° F. (82° C.). The preform was then molded utilizing a pressure applied at a rate of 50 p.s.i./sec. until an equivalent molding pressure of 6500 p.s.i. was reached. The molding die assembly was then heated to a temperature of 315° F. (157° C.) for 2 hours.

A multitude of holes 8 having a diameter of 0.030 inch with ¼ spacing between the holes was drilled through the resin impregnated fibrous graphite insulator.

A rocket containing the thus prepared exit cone insulator was fired at an adiabatic temperature in excess of 6000° F. and a duration time of over 60 seconds. No chunking occurred.

In a similar test using phenol-formaldehyde impregnated graphite the exit cone was divided into four quadrants and holes were drilled in two of them alternately. One contained holes 0.030 diameter with ¼ inch spacing and the other quadrant contained holes of the same size but on ½ inch spacing. The drilled material performed better than ATJ graphite. The holes spaced ¼ inch apart gave better performance than those placed ½ inch apart. A slight amount of chunking was observed at the ½ inch spacing.

In another example an exit cone insulator was made of a composite molding of graphite fibrous and silicate fibrous molding materials. The holes had a diameter of 0.030 inch and were spaced radially ¼ inch on centers.

The molding procedure was as follows. Fibrous graphite cloth was chopped into ½ inch squares and impregnated with 29% by weight of phenol-formaldehyde resin.

Silica fiber cloth (Sil-Temp) was chopped into ½ inch squares and impregnated with 30% by weight of the phenol-formaldehyde resin.

The graphite and silica sections were preformed to size at a temperature below 180° F. The two preforms were then inserted in a high pressure die having a punch temperature of 150° F. and a cavity temperature of 200° F. The molding pressure on the assembled preforms was applied at a rate of 50 p.s.i./sec. until an equivalent molding pressure of 6500 p.s.i. was reached. The molding die assembly was then heated to a temperature of 315° F. and maintained at this temperature for 2 hours to produce the finished exit cone insulator. This insulator proved resistant to chunking upon firing at over 6000° F. for over one minute.

In another experiment similar to the first one, the holes were drilled only half-way through the sample. Chunking in this case also did not occur.

The holes are preferably spaced symmetrically, but can be spaced irregularly.

For best results the insulator parts should be made by use of a tape or shingle type structure or by use of a longitudinal shingle or rosette type structure. In such structures only the edge of each layer of material is exposed to the hot products of combustion.

For simplicity, FIGURE 1 shows the holes being drilled only partly around the insulator surface. In actuality the holes are drilled substantially completely around such surface.

While the preferred hole sizes and spacing are set forth above, it will be realized that these can be varied to some extent depending upon the design of the insulator.

The holes provided sufficient passage area to adequately exhaust the gases as they were formed. The use of holes 1/16 inch (0.07 inch) diameter with ¼ inch spacing or ½ inch spacing has also proven successful in making chunking resistant insulators.

Figure 4:
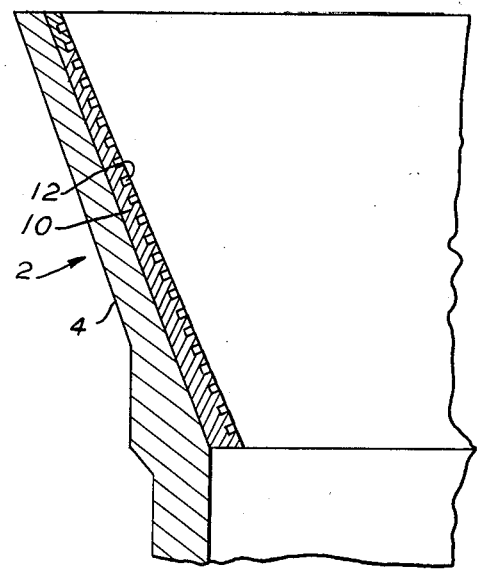
FIGURE 4 is a view similar to FIGURE 2 illustrating another type of rocket insulator.

FIGURE 4 illustrates an exit cone 2 having an aluminized shell 4 and an insulator 10 made of fibrous graphite cloth impregnated with phenol-formaldehyde resin. A multitude of holes 12 were drilled half way through the resin, impregnated fibrous graphite insulator.

Figure 5:
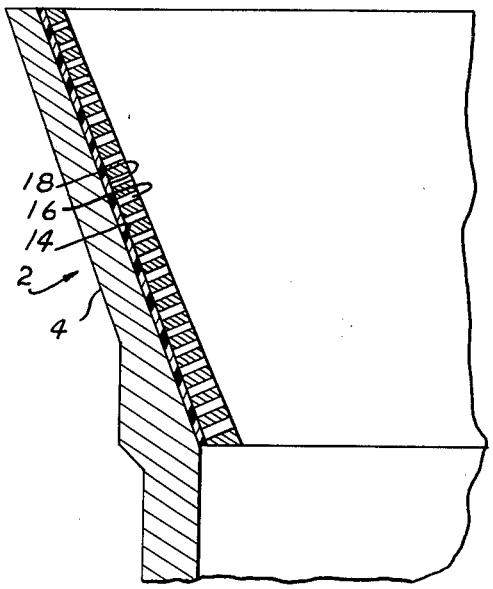
FIGURE 5 is a view similar to FIGURE 2 illustrating still another form of rocket insulator.

FIGURE 5 shows an exit cone 2 having an aluminized shell 4 and an insulator. The insulator was a laminate of a layer 14 of fibrous graphite cloth impregnated with phenol-formaldeyhde resin and a layer 18 of silica fiber cloth impregnated with phenol-formaldehyde resin. As shown in FIGURE 5, holes 16 were drilled through the graphite cloth section of the insulator.

The insulators of the present invention can be employed with any of the rockets designed for use at high temperatures, such as the rocket shown in FIGURE 1 of the Ward patent.

What is claimed is:

1. An insulator designed to withstand chunking when the insulator is subjected to a high velocity gas stream at temperatures in excess of 2000° F., said insulator comprising a molded foraminous structure, the foramina extending a susbtantial way therethrough on the side of the insulator which is to be subjected to said high velocity, hot gas stream, said molded structure comprising a graphite fibrous structure containing a resin binder.

2. An insulator according to claim 1 wherein the foramina comprise a multitude of apertures which extend a substantial distance but not completely through said molded structure.

3. An insulator according to claim 2 wherein the foramina are spaced symmetrically up to ¼ inch apart and have a diameter of 0.03 inch.

4. A rocket having portions thereof which are subjected to a high velocity gas stream and temperatures in excess of 2000° F., said portions normally having chunking at such temperatures with such a gas stream and comprising a molded structure having a multitude of pores extending a substantial way but not completely therethrough on the side of the insulator which is to be subjected to said high velocity, hot gas stream, whereby said chunking is substantially eliminated, said molded structure comprising a graphite fibrous structure containing a resinous binder.

5. A rocket according to claim 4 wherein said binder is a phenol-formaldehyde resin.

6. An insulator designed to withstand chunking when the insulator is subjected to a high velocity gas stream at temperatures in excess of 2000° F., said insulator comprising a molded laminate structure, one of said laminae comprising fibrous graphite and a resin binder and the other of said laminae comprising fibrous silica containing a resin binder, there being a multitude of pores extending at least a substantial way through the fibrous graphite on the side of the insulator which is to be subjected to said high velocity, hot gas stream but not extending completely through the fibrous silica.

7. An insulator according to claim 2 wherein the apertures extend half way through said molded structure.

8. A rocket having an exit cone which is subjected to a high velocity gas stream and temperatures in excess of 2000° F., said exit cone having a shell and an insulator therefor, said insulator comprising fibrous graphite and a resin binder, there being a multitude of pores extending from the side of the insulator which is to be subjected to said hot gas stream a substantial distance but not completely through to the other side of said insulator.

9. An insulator designed to withstand chunking when the insulator is subjected to a high velocity gas stream at temperatures in excess of 2000° F., said insulator comprising a molded foraminous structure, the foramina extending a substantial way therethrough on the side of the insulator which is to be subjected to said high velocity, hot gas stream, said molded structure comprising a graphite fibrous structure containing an elastomer.

References Cited by the Examiner

UNITED STATES PATENTS

| 2,835,107 | 5/58 | Ward | 60—35.6 |
| 2,992,960 | 7/61 | Leeg et al. | 60—35.6 |
| 3,022,190 | 2/62 | Feldman | 60—35.6 |
| 3,026,806 | 3/62 | Runton | 102—92.5 |
| 3,081,705 | 3/63 | Warnken | 60—35.6 |
| 3,103,784 | 9/63 | Vetter et al. | 60—35.6 |

FOREIGN PATENTS

| 867,687 | 5/61 | Great Britain. |

OTHER REFERENCES

Astrolite, H. I. Thompson, Fiber Glass Co., Products Bulletin, No. PB 7–24A, July 1, 1959 (pages 1–4 relied on).

SAMUEL LEVINE, *Primary Examiner.*

SAMUEL FEINBERG, *Examiner.*